US010652783B2

(12) United States Patent
Tsou et al.

(10) Patent No.: US 10,652,783 B2
(45) Date of Patent: May 12, 2020

(54) AUTHENTICATION SYSTEM AND METHOD THEREOF FOR INTEGRATING HETEROGENEOUS NETWORK

(71) Applicant: Chunghwa Telecom Co., Ltd., Yangmei, Taoyuan County (TW)

(72) Inventors: Yao-Chun Tsou, Yangmei (TW); Po-Hsueh Wang, Yangmei (TW); Sz-Hsien Wu, Yangmei (TW); Chung-Ho Wang, Yangmei (TW); Chia-Horng Liu, Yangmei (TW)

(73) Assignee: Chunghwa Telecom Co., Ltd., Yangmei (TW)

( * ) Notice: Subject to any disclaimer, the term of this patent is extended or adjusted under 35 U.S.C. 154(b) by 3 days.

(21) Appl. No.: 15/486,939

(22) Filed: Apr. 13, 2017

(65) Prior Publication Data
US 2017/0359753 A1    Dec. 14, 2017

(30) Foreign Application Priority Data

Jun. 8, 2016    (TW) .............................. 105118320 A

(51) Int. Cl.
*H04W 28/08*    (2009.01)
*H04W 8/18*    (2009.01)
*H04W 8/26*    (2009.01)
*H04W 12/06*    (2009.01)
*H04W 40/12*    (2009.01)

(52) U.S. Cl.
CPC ............. *H04W 28/08* (2013.01); *H04W 8/18* (2013.01); *H04W 8/26* (2013.01); *H04W 12/06* (2013.01); *H04W 40/12* (2013.01)

(58) Field of Classification Search
CPC ..... H04W 28/08; H04W 40/12; H04W 12/06; H04W 8/26; H04W 8/18
USPC .......................................... 455/411
See application file for complete search history.

(56) References Cited

U.S. PATENT DOCUMENTS

| 8,942,709 | B2* | 1/2015 | Bonner | H04W 4/16 |
| | | | | 455/445 |
| 2013/0074161 | A1 | 3/2013 | Malinen et al. | |
| 2013/0242897 | A1 | 9/2013 | Meylan et al. | |
| 2015/0012986 | A1 | 1/2015 | Sun et al. | |
| 2015/0358889 | A1 | 12/2015 | Arora et al. | |

(Continued)

*Primary Examiner* — Shahriar Behnamian
(74) *Attorney, Agent, or Firm* — Amin, Turocy & Watson, LLP

(57) ABSTRACT

An authentication system and method thereof for integrating heterogeneous network is provided. The authentication system triggers the heterogeneous network router when an external terminal device is located in a service covering range of the heterogeneous network router and the wireless router, and the authentication server is triggered to authenticate the terminal device when the terminal device has a heterogeneous network integration access condition, and after the authentication server finishes the authentication of the terminal device, the terminal device is ordered by the heterogeneous network router to communicate with the heterogeneous network router and the wireless router in the same time so as to perform the splitting operation of the telecommunication traffic. By the aforementioned operations, the system can provide the terminal device to access the mobile network and the wireless network in the same time, and promote the communication quality significantly.

6 Claims, 6 Drawing Sheets

(56) References Cited

U.S. PATENT DOCUMENTS

2017/0104717 A1\* 4/2017 Vesterinen .......... H04L 61/2007
2017/0289839 A1\* 10/2017 Choi ................ H04W 28/0278
2017/0290021 A1\* 10/2017 Choi .................... H04W 72/06

\* cited by examiner

AUTHENTICATION SYSTEM AND METHOD THEREOF FOR INTEGRATING HETEROGENEOUS NETWORK

This application claims priority benefit of TW Patent Application Ser. No. 105118320 filed 2016 Jun. 8 which is hereby incorporated herein by reference its entirety.

BACKGROUND OF THE INVENTION

1. Field of the Invention

The present invention is an authentication system and method thereof, and more particularly to an authentication system and method thereof for integrating heterogeneous network.

2. Description of the Prior Art

Conventional wireless communication transmission only uses a single wireless communication system to transmit data, which allows the access authentication thereof to independently operate, so that the access authentication method purely depends on the technical specifications and technologies of the wireless communication system. For example, 4G LTE transmits IMSI through the terminal or GUTI performs relevant authentications and registrations with its background HSS server to acquire the authorization for network transmission service, and Wi-Fi uses 802.1X authentication to provide the authentication and network access control mechanism and helps the data reach an encryption effect.

The technical content of the U.S. patent application "System and method for heterogeneous carrier aggregation" (US 20130242897) discloses that when accessing the mobile network and transmitting the Wi-Fi, it is required that the terminal Wi-Fi module DHCP function is disabled and the IP address of the mobile network is assigned to the terminal wireless network module to avoid terminal access and errors occurring when transmitting, however, the relevant heterogeneous network access authentication control mechanism is not taken into consideration in the application, and the wireless network and mobile communication network cannot be simultaneously accessed by the terminal device.

In the unified authentication platform controlling heterogeneous network access authentication mechanism disclosed by the technical content of the U.S. patent application "Authentication method and system oriented to heterogeneous network" (US 20150012986), when the terminal device requests to sign in one of the networks, it is requested that the request is sent to the unified authentication platform, after receiving the signal, the unified authentication platform sends the authentication code to the terminal and the network to be accessed. The terminal device transmits the authentication code to the network to be accessed again to verify the authentication code, so as to finish the heterogeneous network access authentication mechanism. However, the application only can allow the terminal device to access a network, which causes operational inconvenience.

In conclusion, how to provide a technical means which can allow the terminal device to communicate with the wireless network and mobile network and perform the transmission in the same time becomes a technical issue to be solved in this field.

SUMMARY OF THE INVENTION

To solve the above-disclosed problem, the objective of the present invention is to provide a system and method thereof which can allow the terminal device to communicate with the wireless network and the mobile network and perform the transmission at the same time.

To achieve the aforesaid objective, the present invention provides an authentication system for integrating heterogeneous network. The system comprises one or a plurality of wireless routers, a wireless gateway, a mobile network core system, a heterogeneous network router and an authentication server. The wireless router is configured to provide a wireless network service for the connecting device. The wireless gateway is configured with the wireless router. The heterogeneous network router is connected with the mobile network core system and the wireless router so as to provide a mobile network service for the connecting device. The authentication servo is connected with the wireless gateway and mobile network core system. When an external terminal device is located in a service covering range of the heterogeneous network router and the wireless router, then the heterogeneous network router is triggered. When the terminal device has a heterogeneous network integration access condition, the authentication server is triggered to authenticate the terminal device, and after the authentication server finishes the authentication of the terminal device, the terminal device is ordered by the heterogeneous network router to communicate with the heterogeneous network router and the wireless router in the same time so as to perform the splitting operation of the telecommunication traffic.

To achieve the aforesaid objective, the present invention further provides an authentication method for integrating a heterogeneous network. The method is applied in an authentication system and comprises the following determining whether an external terminal device is located in a service covering range of the heterogeneous network router of the authentication system and one or a plurality of wireless routers or not, wherein the wireless router is connected with the authentication system and the wireless gateway. Then, enabling the heterogeneous network router to determine that the terminal device has a heterogeneous network integration access condition and the authentication sever of the authentication system is triggered to authenticate the terminal device. Furthermore, enabling the terminal device to be ordered by the heterogeneous network router to communicate with the heterogeneous network router and the wireless router in the same time after the authentication server finishes the authentication of the terminal device, so as to perform the splitting operation of the telecommunication traffic.

In conclusion, the authentication system and authentication method thereof for integrating a heterogeneous network of the present invention can allow the terminal device to communicate with the wireless network and the mobile network through the authentication in the same time, so that the deficiencies in the prior art can be solved.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 3-1 and 3-2 are an operation flowchart of the authentication system.

DETAILED DESCRIPTION OF THE PREFERRED EMBODIMENT

The following description is about embodiments of the present invention; however it is not intended to limit the scope of the present invention.

Figure 1:
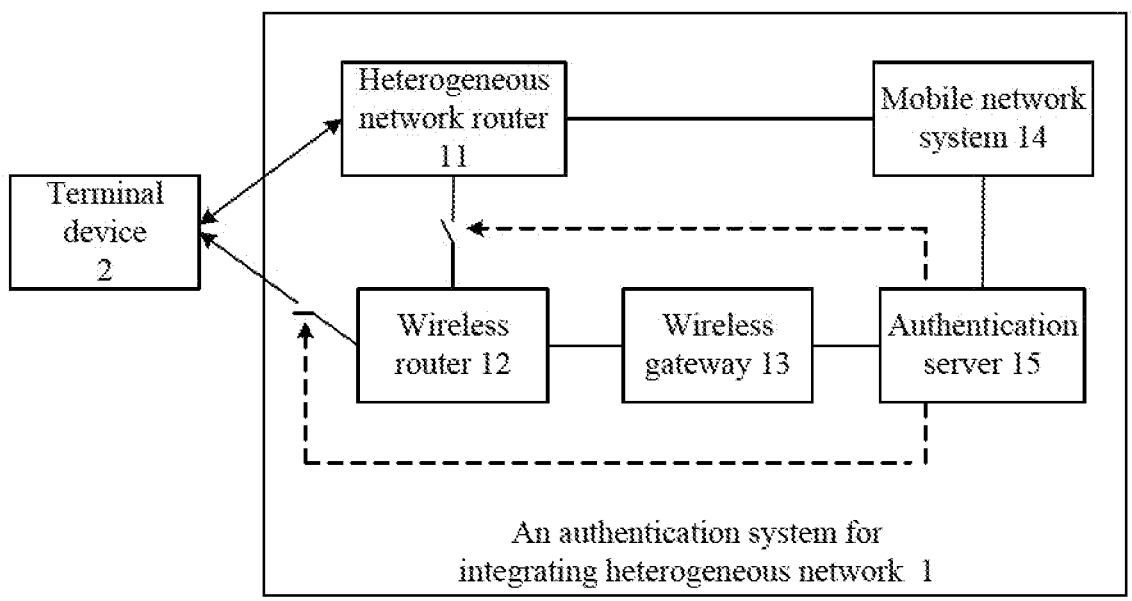
FIG. 1 is a schematic diagram of the authentication system for integrating a heterogeneous network of the first embodiment of the present invention.

FIG. 1 is the schematic diagram of the authentication system 1 for integrating a heterogeneous network of the first embodiment of the present invention. The authentication system includes one or a plurality wireless routers 12, a wireless gateway 13, a mobile network core system 14 (such as, 3G, 4G mobile network core system), a heterogeneous network router 11 and an authentication server 15.

The wireless router 12 is used to provide a wireless network service (such as Wi-Fi) for a connecting device. The wireless gateway 13 is connected and configured with the wireless router 12. The heterogeneous network router 11 is connected with the mobile network core system 14 and the wireless router 12 so as to provide a mobile network service (such as, 3G、4G mobile communication service) for the connecting device. The authentication server 15 is connected with the wireless gateway 13 and the mobile network core system 14, and the heterogeneous network router 11 is configured with the splitting operation between the wireless router 12 and the heterogeneous network router 11. When an external terminal device 2 (such as, smart phone, tablet, etc.) with a communication function is located in a telecommunication service covering range of the heterogeneous network router 11 and the wireless router 12, then the heterogeneous network router 11 is triggered, to authenticate the terminal device 2 when the terminal device 2 has a heterogeneous network integration access condition, the authentication server 15 is triggered to authenticate the terminal device 2, and after the authentication server 15 finishes the authentication of the terminal device 2, the terminal device 2 is ordered by the heterogeneous network router 11 to communicate with the heterogeneous network router 11 and the wireless router 12 in the same time so as to perform the splitting operation of the telecommunication traffic.

In another embodiment, the authentication server 15 inquiries whether the account of the terminal device 2 subscribes a heterogeneous integrating service or not so as to perform the authentication operation. In another embodiment, the wireless gateway 13 is used to control the data transmission operation or IP assignment operation of the wireless router. In another embodiment, the heterogeneous network router 11 and the wireless router 12 perform the splitting operation of the downlink telecommunication traffic of the terminal device 2. In another embodiment, the heterogeneous network router 11 further selects the wireless router 12 which has better communication service to perform the splitting operation.

Figure 2:
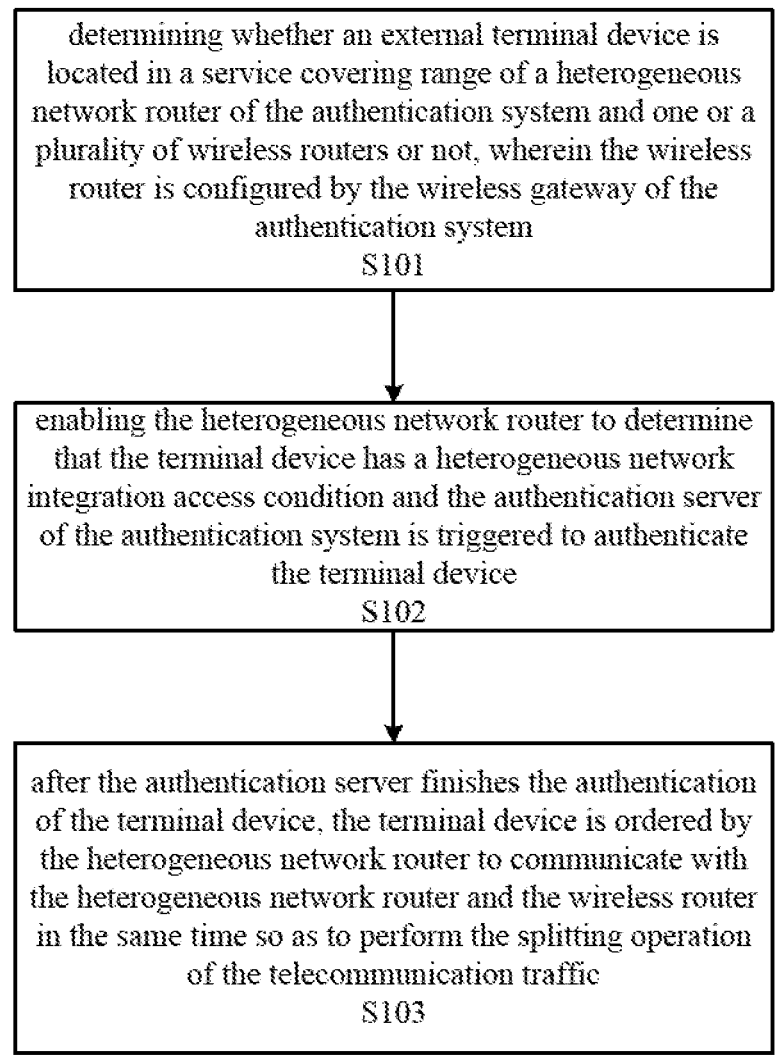
FIG. 2 is a flowchart of the authentication method for integrating a heterogeneous network of the second embodiment of the present invention.

Referring to FIG. 2, the authentication method for integrating a heterogeneous network of the second embodiment of the present invention, applied to the authentication system, includes the following steps:

S101: determining whether an external terminal device 2 is located in a service covering range of a heterogeneous network router 11 and one or a plurality of wireless routers 12 of the authentication system or not, wherein the wireless router 12 is configured by the wireless gateway 13 of the authentication system;

S102: enabling the heterogeneous network router 11 to determine that the terminal device 2 has a heterogeneous network integration access condition and the authentication sever 15 of the authentication system is triggered to authenticate the terminal device 2;

S103: after the authentication server 15 finishes the authentication of the terminal device 2, the terminal device 2 is ordered by the heterogeneous network router 11 to communicate with the heterogeneous network router 11 and the wireless router 12 in the same time so as to perform the splitting operation of the telecommunication traffic.

In another embodiment, the authentication server 15 of the authentication method inquiries whether the account of the terminal device 2 subscribes a heterogeneous integrating service or not so as to perform the authentication operation. In another embodiment, the wireless gateway 13 of the authentication method is used to control a data transmission operation or IP assignment operation of the wireless router 12. In another embodiment, the heterogeneous network router 11 and the wireless router 12 of the authentication method perform the splitting operation of the downlink telecommunication traffic of the terminal device 2. In another embodiment, the heterogeneous network router 11 of the authentication method further selects the wireless router 12 which has better communication service to perform the splitting operation.

The operational flow of the authentication system 1 for integrating heterogeneous network with the first embodiment of the present invention is illustrated hereinafter, but the authentication method for integrating heterogeneous network in the second embodiment can also reach the same or similar technical efficacy.

Figures 1, 3:
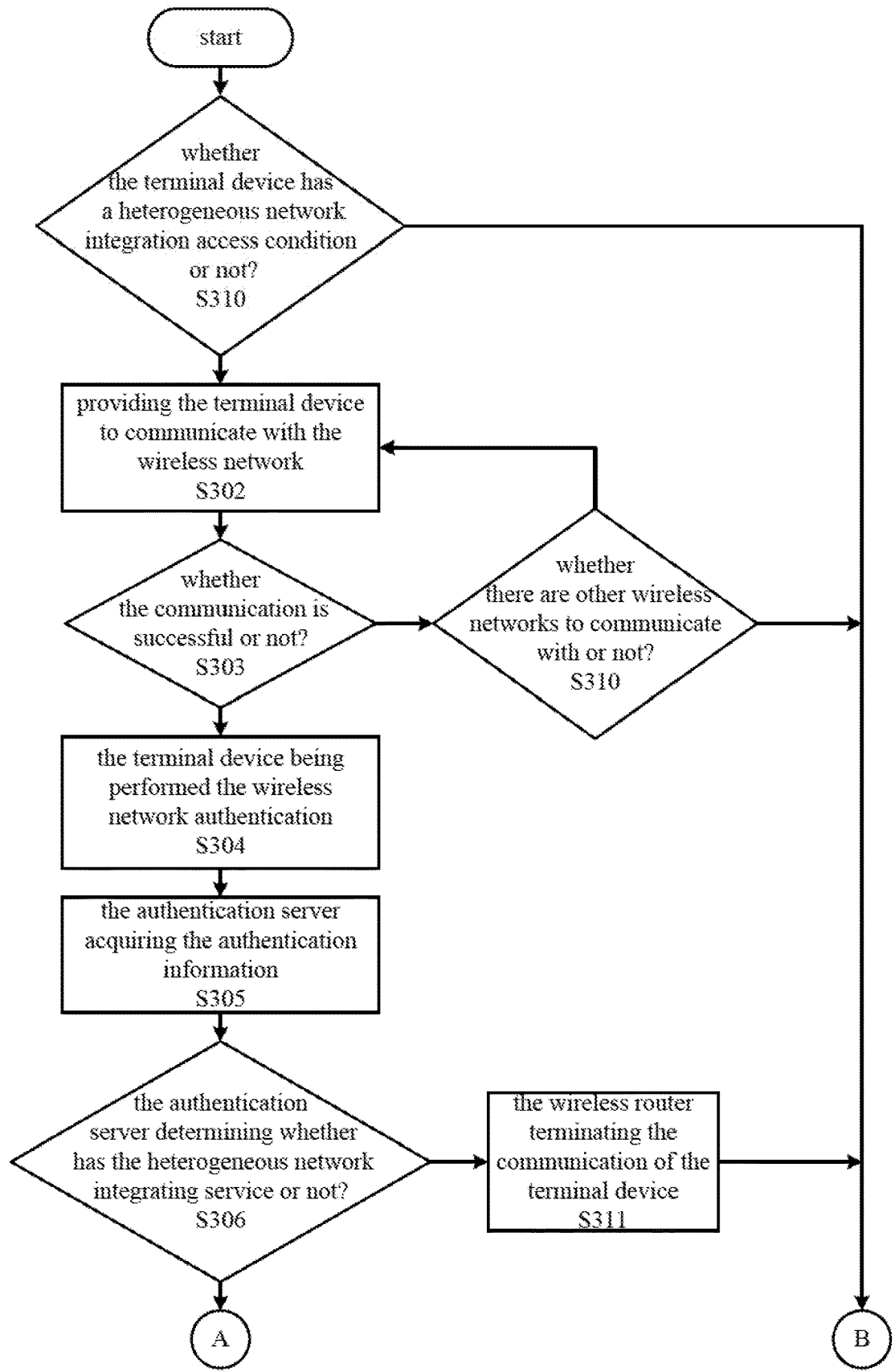
Figures 2, 3:
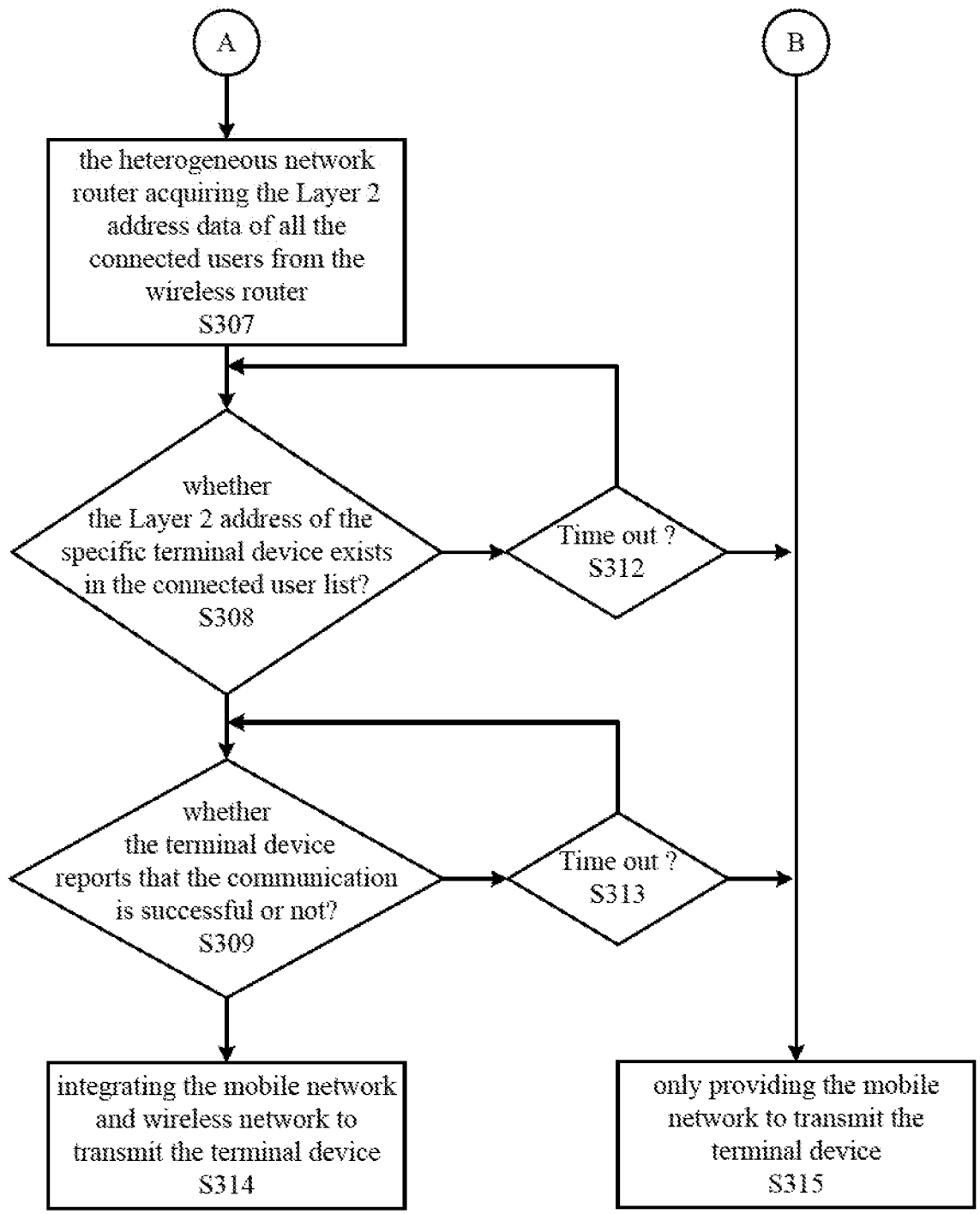

Referring to FIGS. 3-1 and 3-2, when the terminal device 2 is located in a service covering range of a wireless router 12 and the heterogeneous network router 11, i.e. the authentication system is triggered to perform the authentication program. In step 301, when receiving the request, the heterogeneous network router 11 begins to determine whether the terminal device 2 has the access ability of heterogeneous network integrating technology (also has the ability to communicate with the mobile network and the wireless network in the same time) or not. If not, then the system has the access ability of heterogeneous network integrating technology, i.e. enter step 315, the terminal device 2 only uses the mobile network to transmit; if have the access ability of heterogeneous network integrating technology, i.e. enter the step 302, at this time the terminal device 2 begins to communicate with the wireless router 12.

In step 303, whether the communication is successful or not is determined by the wireless router 12. If not, then one proceeds to step 310 to search for other wireless networks to communicate with, and instep 301 further determines whether there are other wireless networks to communicate with or not. If so, then return to the step 302; if not, then enter step 315, and the terminal device 2 only uses the mobile network to transmit.

If the communication is successful, then enter step 304, and the terminal device 2 performs the wireless network authentication. In step 305, the terminal device 2 sends the information relevant to the authentication to the wireless gateway 13 through the wireless router 12. When receiving the authentication request, the wireless gateway 13 transfers the authentication information to the authentication server 15. The authentication server 15 acquires the information relevant to the account of the terminal device from the mobile network core. The authentication information comprises IMSI information, communicating with SSID and other information relevant to the authentication. The authentication server 15 may distinguishes different service rules by the different SSID and authentication information, so that the heterogeneous network integrating technology service and the wireless network service can coexist and efficiently distinguish the different charging type of the account.

Figure 4:
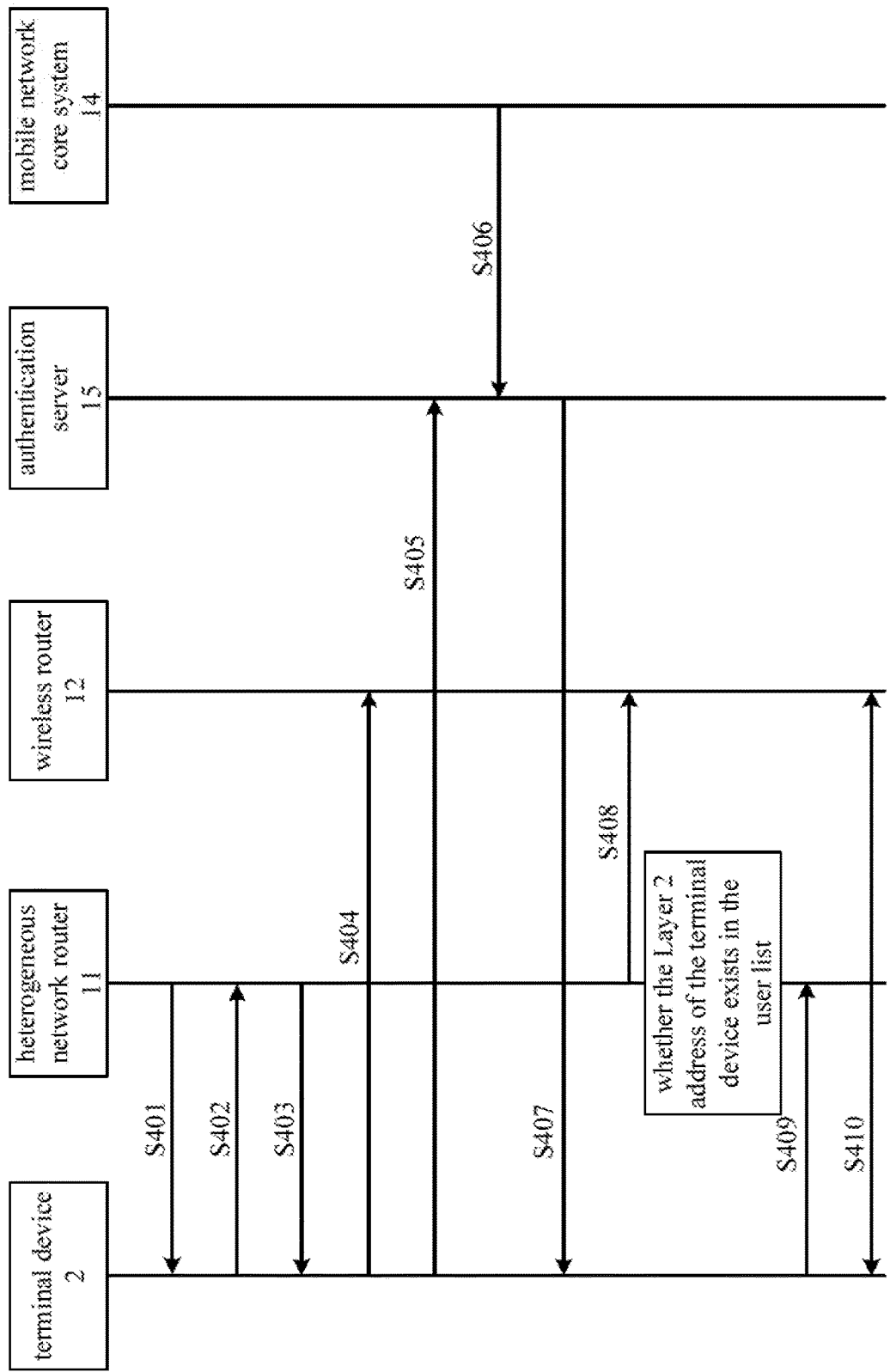
FIG. 4 is an authentication flowchart of the heterogeneous network of a high-cost user account.
Figure 5:
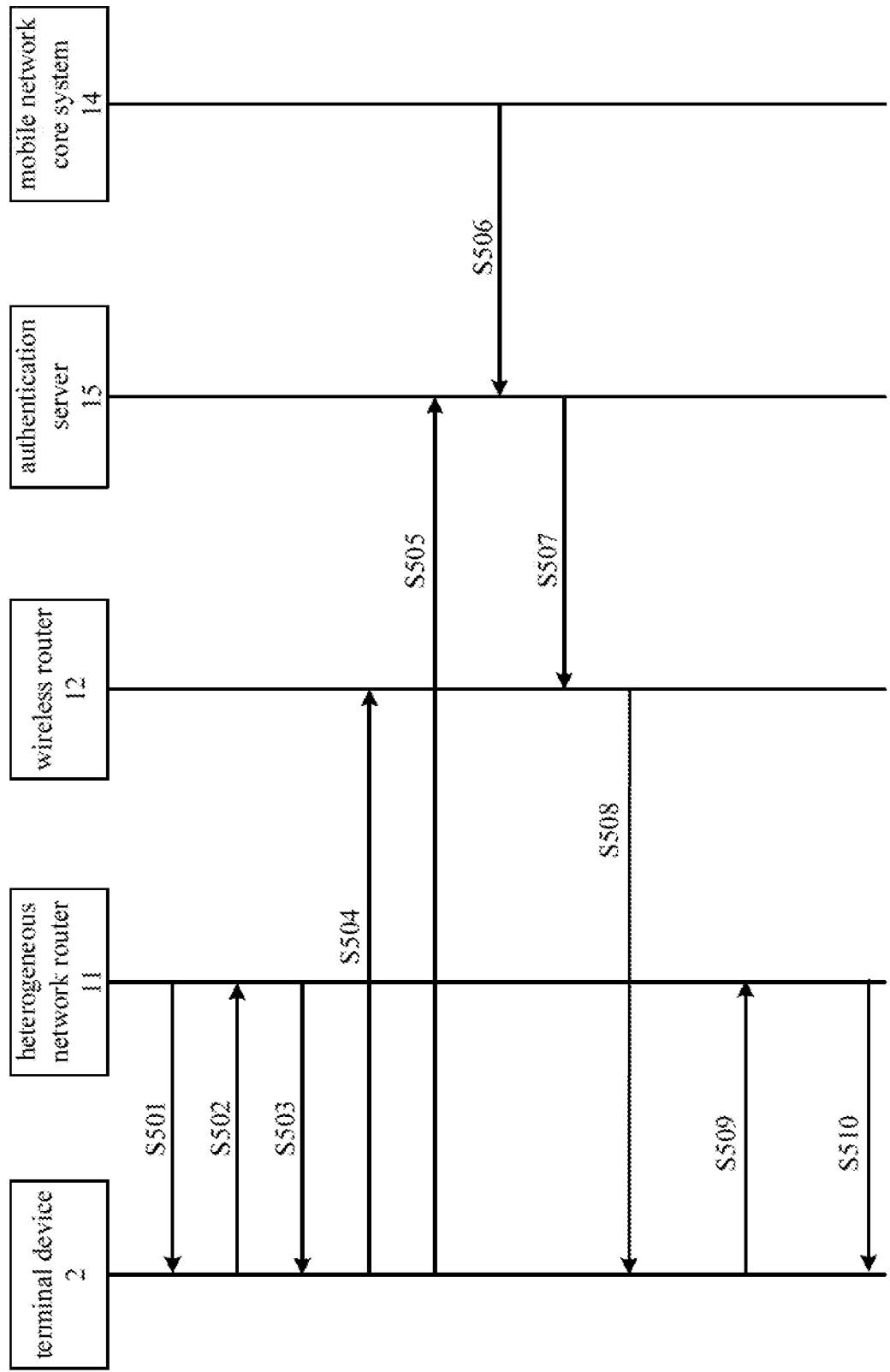
FIG. 5 is an authentication flowchart of the heterogeneous network of a low-cost user account.

The different situations of the charging type of the account are shown in FIGS. 4 and 5, FIG. 4 is the authentication situation of heterogeneous network of high-cost user account, when it is required that the heterogeneous network integrating service is used, it uses SSID as Auto1 to perform the communication (the wireless network service uses SSID as Auto), the authentication server 15 acquires the information relevant to the account thereof, determines that the heterogeneous network terminal 201 describes the heterogeneous network integrating service and is the authorized user of the heterogeneous network integrating service. The steps of the FIG. 4 are described in the following:

S401: determining whether the terminal device 2 has a heterogeneous network integration access condition or not.

S402: the terminal device 2 reporting that it has the heterogeneous network integration access condition.

S403: assigning the terminal device 2 to communicate with the SSID=Auto1.

S404: the terminal device 2 communicating with the SSID=Auto1.

S405: authenticating the terminal device 2.

S406: the authentication server 15 acquiring the authentication information.

S407: successfully authenticating the terminal device 2 (it has the heterogeneous network integration access condition).

S408: acquiring the layer 2 address of all the connected users.

S409: the terminal device 2 reporting that the communication is successful.

S410: activating the heterogeneous network integrating and communicating operations.

FIG. 5 is the authentication situation of heterogeneous network of low-cost user account, due to the too low cost, the authentication server 15 determines that it does not describe the heterogeneous network integrating service and only can use the mobile network to transmit. The steps of the FIG. 5 are described in the following:

S501: determining whether the terminal device 2 has a heterogeneous network integration access condition or not.

S502: the terminal device 2 reporting that it has the heterogeneous network integration access condition.

S503: assigning the terminal device 2 to communicate with the SSID=Auto1.

S504: the terminal device 2 communicating with the SSID=Auto1.

S505: authenticating the terminal device 2.

S506: the authentication server 15 acquiring the authentication information.

S507: successfully authenticating the terminal device 2 (it has the heterogeneous network integration access condition).

S508: terminating the communication of the terminal device 2.

S509: the terminal device 2 reporting that the communication fails.

S510: only using the mobile network to transmit.

In step 306 the authentication server 15 is enabled to determine whether the terminal device 2 has the authority to access and use the heterogeneous network integrating service or not. If not, enter step 311, where the communication between the wireless router 12 and the terminal device 2 is terminated, and the mobile network is only used to transmit; if so, enter step 307, where the heterogeneous network router 11 regularly or irregularly asks the wireless router 12 for the Layer 2 address data of all the connected users.

In step 308, the heterogeneous network router 11 is enabled to further determine whether the Layer 2 identification address of the terminal device 2 exist in the communication terminal list data or not. If not, enter the step 312 and determine whether the time counter is terminated or not (Time out). If the time counter is terminated, enter the step 315, the terminal device 2 only uses the mobile network to transmit; if the time counter is not terminated, then return to the step 308.

If the Layer 2 identification address of the terminal device 2 exist in the communication terminal list data, then enter the step 309, enabling the heterogeneous network router 11 to determine that whether receives the information that the communication of the terminal device 2 is successful or not. If so, enter the step 314, activating the heterogeneous network integrating technology terminal device 2 and using the mobile network and the wireless network to transmit in the same time; if not, enter the step 313, determining whether the time counter is terminated or not.

If the time counter is terminated, then return to the step 315, at this time, the terminal device 2 only uses the mobile network to transmit. If the time counter is not terminated, then return the step 309. The information that the communication is successful is further transmitted by the terminal device 2, so that the unfinished authentication due to the terminal device 2 can be avoided, but the Layer 2 identification address of the terminal device 2 has existed in the communication terminal list data of the wireless router 12, so that erroneous behavior of the authentication occurs.

When finishing the authentication, whether the wireless gateway 13 distributes the IP address to the terminal device 2 or not, the heterogeneous network integrating can be performed. If the wireless gateway 13 distributes the IP address to the terminal device 2, the terminal device 2 also uses the wireless router 12, wireless gateway 13 and the Internet to transmit. If the wireless gateway 13 does not distribute the IP address to the terminal device 2, the erroneous behavior of the terminal device 2 can be avoided. When the terminal device 2 successfully accesses and enters the heterogeneous network integrating service, the downlink telecommunication traffic of the terminal device 2 is transmitted to the heterogeneous network router 11, the heterogeneous network router 11 performs the splitting and transmits the partial downlink telecommunication traffic through the mobile network, and the wireless router 12 transmits the remaining to the terminal device 2 through the wireless network. The terminal device 2 receives the downlink telecommunication traffic transmitted by the heterogeneous network router 11 and the wireless router 12 in the same time, and rebuilds the received downlink telecommunication traffic.

FEATURES AND EFFECTS

The conventional wireless transmission only uses single wireless communication system to transmit data, which allow the access authentication thereof to independently operate, so that the access authentication method purely depends on the technical specifications and technologies of the wireless communication system. The present invention provides an authentication system and method for heterogeneous network integrating, which performs the control and management of the authority relevant to the heterogeneous network integrating technology through the wireless network access authentication program and determines whether the terminal device 2 successfully accesses heterogeneous network integrating technology or not and uses the mobile network and the wireless network to transmit the downlink telecommunication traffic in the same time, and compared to the other conventional technologies, has the following advantages:

(1) Present invention solves problem that the standard does not formulates the authentication system and method of relevant heterogeneous network integrating, and the present invention provides an authentication system and method for heterogeneous network integrating for the operator of the telecommunications, which can efficiently control and manage the relevant usage authority of the users.

(2) The authentication system and method for heterogeneous network integrating provided by the present invention can perform the control and management of the authority relevant to the heterogeneous network integrating technology in a way of authentication by the wireless network, and efficiently improve the safety and convenience of the heterogeneous network integrating service.

(3) The present invention can use the existing mobile network and the wireless network system to reduce the building cost.

(4) The present invention can avoid the occurrence of the erroneous behavior of the terminal due to the terminal not in accordance with the standard authentication process.

The above disclosure is related to the detailed technical contents and inventive features thereof. Those skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An authentication system for integrating heterogeneous network, comprising:
   one or a plurality of wireless routers, used to provide a wireless network service for a connecting device;
   a wireless gateway, connected with and configured with the wireless router;
   a mobile network core system;
   a heterogeneous network router, with customized function of error behavior handling, connected with the mobile network core system and the wireless router for asking Layer 2 address data of all connected users from the wireless router so as to provide a mobile network service for the connecting device; and
   an authentication server, connected with the wireless gateway, the mobile network core system, and configured with the splitting operation between the wireless router and the heterogeneous network router;
   wherein, when an external terminal device is located in a service covering range of the heterogeneous network router and the wireless router, the heterogeneous network router is triggered according to the Layer 2 address data to determine whether the terminal device has a heterogeneous network integration access condition or not, when the terminal device has a heterogeneous network integration access condition, the authentication server is triggered to authenticate the terminal device, and after the authentication server finishes the authentication of the terminal device, the terminal device is ordered by the heterogeneous network router to communicate with the heterogeneous network router and the wireless router in the same time so as to perform the splitting operation of the telecommunication traffic.

2. The authentication system according to claim 1, wherein the authentication server inquiries whether the account of the terminal device subscribes a heterogeneous integrating service or not so as to perform the authentication operation.

3. The authentication system according to claim 1, wherein the wireless gateway is used to control a data transmission operation or Internet Protocol (IP) assignment operation of the wireless router.

4. The authentication system according to claim 1, wherein the heterogeneous network router and the wireless router perform the splitting operation of the downlink telecommunication traffic of the terminal device.

5. The authentication system according to claim 1, wherein the heterogeneous network router further selects the wireless router which has better communication service to perform the splitting operation.

6. An authentication system for integrating heterogeneous network, comprising:
   one or a plurality of wireless routers, used to provide a wireless network service for a connecting device;
   a wireless gateway, connected with and configured with the wireless router;
   a mobile network core system;
   a heterogeneous network router, connected with the mobile network core system and the wireless router for asking Layer 2 address data of all connected users from the wireless router so as to provide a mobile network service for the connecting device; and
   an authentication server, connected with the wireless gateway, the mobile network core system, and configured with the splitting operation between the wireless router and the heterogeneous network router;
   wherein, when an external terminal device is located in a service covering range of the heterogeneous network router and the wireless router, the heterogeneous network router is triggered according to the Layer 2 address data to determine whether the terminal device has a heterogeneous network integration access condition or not, when the terminal device has a heterogeneous network integration access condition, the authentication server is triggered to authenticate the terminal device, and after the authentication server finishes the authentication of the terminal device, the terminal device is ordered by the heterogeneous network router to communicate with the heterogeneous network router and the wireless router in the same time so as to perform the splitting operation of the telecommunication traffic.

* * * * *